United States Patent [19]

Hirahara et al.

[11] Patent Number: 4,959,421
[45] Date of Patent: Sep. 25, 1990

[54] COPOLYMERIZED POLYESTER HAVING EXCELLENT TRANSPARENCY AND GAS BARRIER PROPERTIES

[75] Inventors: Takuji Hirahara, Kawasaki, Japan; Masahiro Nukui, Delden, Netherlands; Katsuji Tanaka, Machida, Japan

[73] Assignee: Mitsubishi Kasei Corporation, Tokyo, Japan

[21] Appl. No.: 328,517

[22] Filed: Mar. 24, 1989

[30] Foreign Application Priority Data

| Mar. 26, 1988 [JP] | Japan | 63-72199 |
| Mar. 29, 1988 [JP] | Japan | 63-73422 |
| Mar. 29, 1988 [JP] | Japan | 63-73423 |
| Sep. 20, 1988 [JP] | Japan | 63-235181 |

[51] Int. Cl.$^5$ .................................... C08G 63/66
[52] U.S. Cl. ............................. 525/437; 264/340; 428/34.1; 428/411.1; 528/176; 528/190; 528/191; 528/193
[58] Field of Search ............... 528/176, 190, 191, 193; 525/437, 444, 448

[56] References Cited

U.S. PATENT DOCUMENTS

| 4,403,090 | 9/1983 | Smith | 528/272 |
| 4,435,590 | 3/1984 | Shalaby et al. | 528/271 |
| 4,510,295 | 4/1985 | Bezwada et al. | 528/176 |
| 4,532,928 | 8/1985 | Bezwada et al. | 528/176 |
| 4,546,152 | 10/1985 | Koelmel et al. | 525/437 |
| 4,663,425 | 5/1987 | Evers et al. | 528/183 |
| 4,689,424 | 8/1987 | Shalaby et al. | 528/176 |

OTHER PUBLICATIONS

Chemical Abstracts, vol. 102(6): 463642, J. Polym. Sci. (1984), "Studies on Some Newer Polyhydrazides Containing Amide Linkages III.", Shukla, J. S. et al.

Primary Examiner—Harold D. Anderson
Assistant Examiner—T. Mosley
Attorney, Agent, or Firm—Oblon, Spivak, McClelland, Maier & Neustadt

[57] ABSTRACT

Disclosed herein are a copolymerized polyester produced by copolymerizing a dicarboxylic acid component (A) comprising (a) 10 to 90 mol % of isophthalic acid or an ester forming derivative thereof,
(b) 10 to 60 mol % of a phenylenedi(oxyacetic acid) represented by the formula [I]:

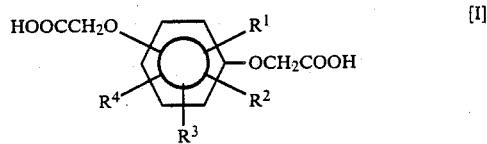

(wherein $R^1$, $R^2$, $R^3$, and $R^4$ each represent a hydrogen atom, an alkyl group having 1 to 6 carbon atom, an alkoxy group having 1 to 6 carbon atom, a phenyl group, a chlorine atom, a bromine atom or a fluorine atom), or an ester forming derivative thereof, and
(c) 0 to 45 mol % of a naphthalenedicarboxylic acid or an ester forming derivative thereof, and a diol component (B); and a polyester composition containing the copolymerized polyester.

2 Claims, No Drawings

COPOLYMERIZED POLYESTER HAVING EXCELLENT TRANSPARENCY AND GAS BARRIER PROPERTIES

BACKGROUND OF THE INVENTION

The present invention relates to a copolymerized polyester and, more particularly, to a copolymerized polyester which is excellent in transparency and gas barrier property, and is useful as a packaging material in the form of a container and a film.

Polyethylene terephthalate which has excellent physical properties such as mechanical strength, chemical stability, transparency and hygienic quality, and which is light in weight and low in cost, is widely used for a container and a film as a packaging material.

However, the gas barrier property of polyethylene terephthalate cannot be said to be sufficient in some fields, although it is superior to those of other resins such as polyolefin. For example, a packaging material for carbonated beverage, beer and wine is required to have high oxygen gas barrier property and carbon dioxide gas barrier property in order to preserve the content, and a generally used hollow container of biaxially oriented polyethylene terephthalate cannot satisfy those strict conditions on gas barrier properties.

To solve this problem, various methods for improving the gas barrier property of a polyethylene terephthalate container have been proposed. For example, (1) a method of labeling a gas barrier material on a polyethylene terephthalate container or coating the polyethylene terephthalate container with a gas barrier material (Japanese Patent Application Laid-Open (KOKAI) No. 54-117565 (1979)), (2) a method of producing a multi-layered container comprising polyethylene terephthalate and a gas barrier material (Japanese Patent Application Laid-Open (KOKAI) No. 56-64839 (1981)), and (3) a method of producing a container from polyethylene terephthalate with a gas barrier material blended therewith (Japanese Patent Application Laid-Open (KOKAI) Nos. 57-10640 (1982), 59-64658 (1984) and 61-43655 (1986)) have been proposed.

In the methods (1) and (2), polyvinyliden chloride, a saponified ethylene-vinyl acetate copolymer, metaxylene diamine nylon, etc. are exemplified as a gas barrier material. These methods, however, are disadvantageous in the manufacturing process because the step for coating a container with a gas barrier material is added and a new apparatus for producing a multi-layered container is required. The methods (1) and (2) are also disadvantageous in that if the adhesion between the barrier layer and the polyethylene terephthalate layer is poor, a ply separation there between is produced.

On the other hand, the method (3) is advantageous in that it is possible to produce a container having a gas barrier property by utilizing conventional manufacturing apparatus and manufacturing process. However, since a material having a good compatibility with polyethylene terephthalate and a refractive index approximate to that of polyethylene terephthalate is necessary in order to maintain the transparency of a blend, a material is not usable as a gas barrier material in the method (3) merely because it has an excellent gas barrier property. Although polyethylene isophthalate and a copolyester thereof have been proposed as a gas barrier material which satisfies the above-described requirements, the gas barrier properties thereof are insufficient for improving the gas barrier property of polyethylene terephthalate.

As a polyester used as a packaging material in place of polyethylene terephthalate, polyalkylene isophthalate copolymerized with aliphatic dicarboxylic acid having 4 to 12 carbon atoms has been proposed (U.S. Pat. No. 4,403,090), but this polyester is not sufficient for improving the gas barrier property of a polyethylene terephthalate packaging material.

Although a polyester produced by copolymerizing phenylene dioxydiacetic acid and polyethylene terephthalate has been proposed (Japanese Patent Application Laid-Open (KOKAI) No. 60-501060 (1985)), the improvement of gas barrier property cannot be said to be sufficient.

As a gas barrier material having an excellent ply adhesion, polyesters containing isophthalic acid as the main acid component have been proposed (Japanese Patent Application Laid-Open (KOKAI) Nos. 59-39547 (1984), 59-67049 (1984) and 59-89149 (1984)). In these gas barrier materials disclosed in the above-described specification, however, the barrier level is low and in order to produce a container having a sufficient gas barrier property, it is necessary to make the barrier layer thick. The total thickness of the container is, therefore, inconveniently increased. Alternatively, if the polyethylene terephthalate layer is made thin due to the limitation in the total thickness, the mechanical strength and the heat resistance are impaired.

U.S. Pat. No. 4,663,426 also discloses a polyester resin of a diol and a diacid component comprising about 5 to 50 mole % of phenylenedioxydiacetic acid and 50 to about 95 mole % of naphthalenedicarboxylic acid, and further discloses that other well-known polyester-forming diacid such as isophthalic acid, 1,4-cyclohexanedicarboxylic acid, linear lower alkyldicarboxylic acid may be employed. However, this polyester containing a large amount of naphthalenedicarboxylic acid has a high glass transition point (Tg) and is fundamentally a rigid polymer. Further, when this polyester is used as a blend or a laminate with PET, the improvement of the gas barrier property of PET is insufficient.

As a result of the study undertaken by the present inventors to solve the above-described problems in the prior art, it has been found that a copolymerized polyester obtained by copolymerizing a dicarboxylic acid component (A) containing (a) isophthalic acid or an ester forming derivative thereof and (b) a specific phehylenedi(oxyacetic acid) or an ester forming derivative thereof in a specified ratio and a diol component (B) is excellent not only in physical properties such as mechanical strength and transparency but also in gas barrier property. On the basis of this finding, the present invention has been achieved.

SUMMARY OF THE INVENTION

In a 1st aspect of the present invention, there is provided a copolymerized polyester produced by copolymerizing a dicarboxylic acid component (A) comprising (a) 10 to 90 mol % of isophthalic acid or an ester forming derivative thereof, (b) 10 to 60 mol % of a phenylenedi(oxyacetic acid) represented by the formula [I]:

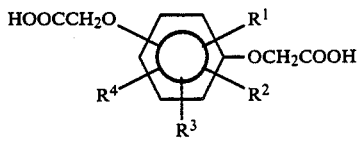

(wherein $R^1$, $R^2$, $R^3$ and $R^4$ each represents a hydrogen atom, an alkyl group having 1 to 6 carbon atoms, an alkoxy group having 1 to 6 carbon atoms, a phenyl group, a chlorine atom, a bromine atom or a fluorine atom), or an ester forming derivative thereof, and
(c) 0 to 45 mol % of a naphthalenedicarboxylic acid or an ester forming derivative thereof; and
a diol component (B).

In a 2nd aspect of the present invention, there is provided a copolymerized polyester produced by copolymerizing a dicarboxylic acid component (A) comprising
(a) 40 to 90 mol % of isophthalic acid or an ester forming derivative thereof, and
(b) 10 to 60 mol % of a phenylenedi(oxyacetic acid) represented by the formula [I]:

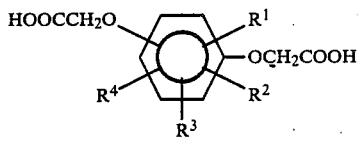

(wherein $R^1$, $R^2$, $R^3$ and $R^4$ each represents a hydrogen atom, an alkyl group having 1 to 6 carbon atoms, an alkoxy group having 1 to 6 carbon atoms, a phenyl group, a chlorine atom, a bromine atom or a fluorine atom), or an ester forming derivative thereof; and
a diol component (B).

In a 3rd aspect of the present invention, there is provided a copolymerized polyester produced by copolymerizing a dicarboxylic acid component (A) comprising
(a) 50 to 85 mol % of isophthalic acid or an ester forming derivative thereof,
(b) 10 to 45 mol % of a phenylenedi(oxyacetic acid) represented by the formula [I]:

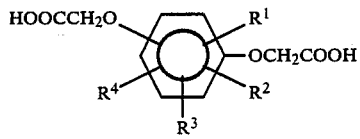

(wherein $R^1$, $R^2$, $R^3$, and $R^4$ each represents a hydrogen atom, an alkyl group having 1 to 6 carbon atoms, an alkoxy group having 1 to 6 carbon atoms, a phenyl group, a chlorine atom, a bromine atom or a fluorine atom), or an ester forming derivative thereof, and
(c) 5 to 40 mol % of naphthalenedicarboxylic acid or an ester forming derivative thereof; and
a diol component (B).

In a 4th aspect of the present invention, there is provided a copolymerized polyester produced by copolymerizing a dicarboxylic acid component (A) comprising
(a) 10 to 50 mol % of isophthalic acid or an ester forming derivative thereof,
(b) 20 to 60 mol % of a phenylenedi(oxyacetic acid) represented by the formula [I]

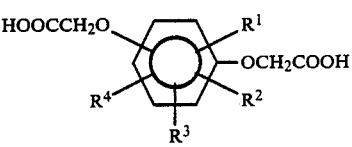

(wherein $R^1$, $R^2$, $R^3$ and $R^4$ each represents a hydrogen atom, an alkyl group having 1 to 6 carbon atoms, an alkoxy group having 1 to 6 carbon atoms, a phenyl group, a chlorine atom, a bromine atom or a fluorine atom), or an ester forming derivative thereof, and
(c) 10 to 45 mol % of naphthalenedicarboxylic acid or an ester forming derivative thereof,
the molar ratio of said component (b) and said component (c) being 50:50 to 80:20; and
a diol component (B).

In a 5th aspect of the present invention, there is provided a polyester composition comprising a copolymerized polyester produced by copolymerizing a dicarboxylic acid component (A) comprising
(a) 10 to 90 mol % of isophthalic acid or an ester forming derivative thereof,
(b) 10 to 60 mol % of a phenylenedi(oxyacetic acid) represented by the formula [I]:

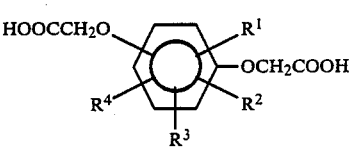

(wherein $R^1$, $R^2$, $R^3$ and $R^4$ each represents a hydrogen atom, an alkyl group having 1 to 6 carbon atoms, an alkoxy group having 1 to 6 carbon atoms, a phenyl group, a chlorine atom, a bromine atom or a fluorine atom), or an ester forming derivative thereof, and
(c) 0 to 45 mol % of a naphthalenedicarboxylic acid or an ester forming derivative thereof, and a diol component (B); and
a polyester containing polyethylene terephthalate as the main component.

In a 6th aspect of the present invention, there is provided a packaging material, a stretched sheet and a hollow container comprising:
a copolymerized polyester produced by copolymerizing a dicarboxylic acid component (A) comprising
(a) 10 to 90 mol % of isophthalic acid or an ester forming derivative thereof,
(b) 10 to 60 mol % of a phenylenedi(oxyacetic acid) represented by the formula [I]:

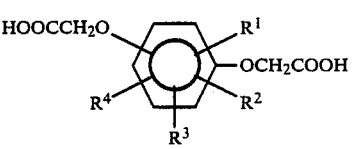

(wherein $R^1$, $R^2$, $R^3$ and $R^4$ each represents a hydrogen atom, an alkyl group having 1 to 6 carbon atoms, an alkoxy group having 1 to 6 carbon atoms, a phenyl group, a chlorine atom, a bromine atom or a fluorine atom), or an ester forming derivative thereof, and (c) 0 to 45 mol % of a naphthalenedicarboxylic acid or an ester forming derivative thereof, and a diol component (B).

In 7th aspect of the present invention, there is provided a packaging material, a stretched sheet and a hollow container comprising:

a copolymerized polyester produced by copolymerizing a dicarboxylic acid component (A) comprising (a) 10 to 90 mol % of isophthalic acid or an ester forming derivative thereof, (b) 10 to 60 mol % of a phenylenedi(oxyacetic acid) represented by the formula [I]:

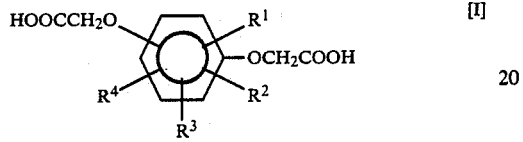

(wherein $R^1$, $R^2$, $R^3$ and $R^4$ each represents a hydrogen atom, an alkyl group having 1 to 6 carbon atoms, an alkoxy group having 1 to 6 carbon atoms, a phenyl group, a chlorine atom, a bromine atom or a fluorine atom), or an ester forming derivative thereof, and (c) 0 to 45 mol % of a naphthalenedicarboxylic acid or an ester forming derivative thereof, and a diol component (B); and a polyester containing polyethylene terephthalate as the main component.

In an 8th aspect of the present invention, there is provided a multi-layered packaging material comprising:

a layer of a copolymerized polyester produced by copolymerizing a dicarboxylic acid component (A) comprising (a) 10 to 90 mol % of isophthalic acid or an ester forming derivative thereof, (b) 10 to 60 mol % of a phenylenedi(oxyacetic acid) represented by the formula [I]:

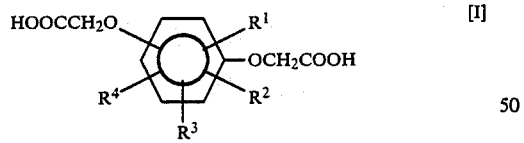

(wherein $R^1$, $R^2$, $R^3$ and $R^4$ each represents a hydrogen atom, an alkyl group having 1 to 6 carbon atoms, an alkoxy group having 1 to 6 carbon atoms, a phenyl group, a chlorine atom, a bromine atom or a fluorine atom), or an ester forming derivative thereof, and (c) 0 to 45 mol % of a naphthalenedicarboxylic acid or an ester forming derivative thereof, and a diol component (B); and a polyester layer containing polyethylene terephthalate as the main component.

In a 9th aspect of the present invention, there is provided a multi-layered packaging material comprising:

a polyester composition layer comprising a copolymerized polyester produced by copolymerizing a dicarboxylic acid component (A) which comprises (a) 10 to 90 mol % of isophthalic acid or an ester forming derivative thereof, (b) 10 to 60 mol % of a phenylenedi(oxyacetic acid) represented by the formula [I]:

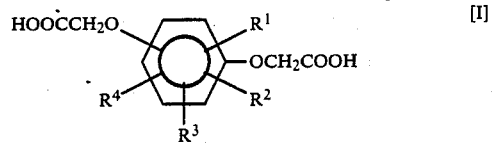

(wherein $R^1$, $R^2$, $R^3$ and $R^4$ each represents a hydrogen atom, an alkyl group having 1 to 6 carbon atoms, an alkoxy group having 1 to 6 carbon atoms, a phenyl group, a chlorine atom, a bromine atom or a fluorine atom), or an ester forming derivative thereof, and (c) 0 to 45 mol % of a naphthalenedicarboxylic acid or an ester forming derivative thereof, and a diol component (B), and a polyester containing polyethylene terephthalate as the main component; and a polyester layer containing polyethylene terephthalate as the main component.

DETAILED DESCRIPTION OF THE INVENTION

As examples of a phenylenedi(oxyacetic acid) represented by the formula [I]:

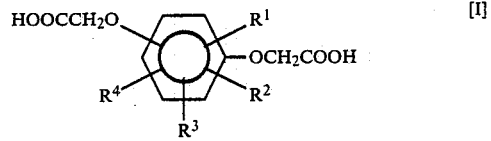

(wherein $R^1$, $R^2$, $R^3$ and $R^4$ each represents a hydrogen atom, an alkyl group having 1 to 6 carbon atoms, an alkoxy group having 1 to 6 carbon atoms, a phenyl group, a chlorine atom, a bromine atom or a fluorine atom), 1,2-phenylenedi(oxyacetic acid), 1,3-phenylenedi(oxyacetic acid), 1,4-phenylenedi(oxyacetic acid), 2-methyl-1,3-phenylenedi(oxyacetic acid), 5-methyl-1,3-phenylenedi(oxyacetic acid), 5-ethyl-1,3-phenylenedi(oxyacetic acid), 4-ethyl-1,3-phenylenedi(oxyacetic acid), 5-methoxy-1,3-phenylenedi(oxyacetic acid), 4-methoxy-1,3-phenylenedi(oxyacetic acid), 4-chloro-1,2-phenylenedi(oxyacetic acid) and 4-chloro-1,3-phenylenedi(oxyacetic acid) may be exemplified. Among these, a derivative of 1,3-phenylenedi(oxyacetic acid) is preferable, and 1,3-phenylenedi(oxyacetic acid) is more preferable.

As a naphthalenedicarboxylic acid in the present invention, any isomer thereof is usable. Especially, 1,4-, 1,5-, 1,8-, 2,3-, 2,6- and 2,7-structural isomers are preferable. Among these, 2,6-naphthalenedicarboxylic acid is particularly preferable.

Phenylenedicarboxylic acids as the dicarboxylic acid component (A) in the present invention may be used as a raw material of a copolymerized polyeser of the present invention either in the form of an acid itself or in the form of an ester forming derivative such as an acid halide and an ester, in particular, an ester forming derivative such as a lower alkyl ester. Alternatively, an oligomer obtained by reacting a phenylenedi (oxyacetic acid) with a glycol may be used for polymerization.

In a copolymerized polyester of the present invention, it is preferable that an amoutn of the phenylenedi-(oxyacetic acid) unit (b) derived from the phenylenedi-(oxyacetic acid) represented by the formula [I] is 10 to 60 mol % based on all repeating units of the dicarboxylic acid component (A). If the phenylenedi(oxyacetic acid) unit derived from the phenylenedi(oxyacetic acid) represented by the formula [I] exceeds 60 mol %, the strength and the heat resistance are unfavorable lowered. On the other hand, if the phenylenedi(oxyacetic acid) unit derived from the phenylenedi(oxyacetic acid) represented by the formula [I] is less than 10 mol %, the gas barrier property is unfavorably lowered.

In a copolymerized polyester of the present invention, an amount of the isophthalic acid unit (a) derived from the isophthalic acid preferably is 10 to 90 mol % based on all repeating units of the dicarboxylic acid component (A). If the isophthalic acid unit exceeds 90 mol %, the gas barrier property is lowered, and if the isophthalic acid unit is less than 10 mol %, the glass transition point (Tg) of the copolymerized ester obtained is lowered so much as to make it difficult to dry the resin before molding.

In a copolymerized polyester of the present invention, an amount of the naphthalenedicarboxylic acid unit (c) derived formthe naphthalenedicarboxylic acid is preferably 0 to 45 mol % based on all repreating units of the dicarboxylic acid component (A). If the naphthalenedicarboxylic acid unit exceeds 45 mol %, the gas barrier property is lowered.

In a copolymerized polyester of the present invention, it is preferable that the sum of the acid component units (a), (b) and (c) is at least 55 mol %, preferably at least 65 mol %, more preferably at least 80 mol % based on all repeating units of the acid component.

Namely, so long as the content of the acid components (a), (b) and (c) contained satisfies the above-described range, it is possible to use another dicarboxylic acid or a derivative thereof.

As such a dicarboxylic acid, an aromatic dicarboxylic acid such as terephtalic acid; phthalic acid, 4,4'-biphenyldicarboxylic acid, 4,4'-diphenoxyethanedicarboxylic acid, 4,4'-diphenylsulfondicarboxylic acid and the structural isomers thereof, an aliphatic dicarboxylic acid such as malonic acid, succinic acid and adipic acid, and an oxy acid and a derivative thereof such as hydroxybenzoic acid, hydroxybenzoate and glycolic acid may be exemplified. Among these, an aromatic dicarboxylic acid such as terephthalic acid, 2,6-naphthalenedicarboxylic acid, and 4,4'-diphenylsulfondicarboxylic acid are preferable.

As the diol component (B) for a copolymerized polyester of the present invention, ethylene glycol, 1,2-propanediol, 1,3-propanediol,1,4-butanediol, pentamethylene glycol, hexamethylene glycol, neopentyl glycol, cyclohexanedimenthanol, diethylene glycol, and a derivative of an aromatic dihydroxy compound such as Bisphenol A and Bisphenol S are usable. Among these, ethylene glycol is preferable.

A copolymerized polyester of the present invention may contain a polyfunctional compound such as trimethylolpropane, pentaerythritol, glycerin, trimellitic acid, trimesic acid and pyromellitic acid and a monofunctional compound such as o-benzoylbenzoic acid in the range which does not impair the effect of the present invention. Such a polyfunctional or monofunctional compound is preferably used in the range of not more than 20 mol % of the diol component (B).

Embodiments of a copolymerized polyester according to the present invention may be described in the following.

(1) a copolymerized polyester produced by copolymerizing:
a dicarboxylic acid component (A) comprising:
  (a) 40 to 90 mol % of isophthalic acid or an ester forming derivative thereof, and
  (b) 10 to 60 mol % of a phenylenedi(oxyacetic acid) represented by the formula [I]:

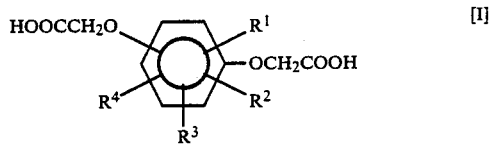

(wherein $R^1$, $R^2$, $R^3$ and $R^4$ each represent a hydrogen atom, an alkyl group having 1 to 6 carbon atoms, an alkoxy group having 1 to 6 carbon atoms, a phenyl group, a chlorine atom, a bromine atom or a fluorine atom), or an ester forming derivative thereof; and
a diol component (B).

(2) a copolymerized polyester produced by copolymerizing:
a dicarboxylic acid component (A) comprising:
  (a) 50 to 85 mol % of isophthalic acid or an ester forming derivative thereof,
  (b) 10 to 45 mol % of a phenylenedi(oxyacetic acid) represented by the formula [I]:

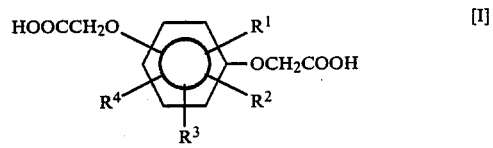

(wherein $R^1$, $R^2$, $R^3$ and $R^4$ each represent a hydrogen atom, an alkyl group having 1 to 6 carbon atoms, an alkoxy group having 1 to 6 carbon atoms, a phenyl group, a chlorine atom, a bromine atom or a fluorine atom), or an ester forming derivative thereof, and
  (c) 5 to 40 mol % of naphthalenedicarboxylic acid or an ester forming derivative thereof; and
a diol component (B).

(3) A copolymerized polyester produced by copolymerizing;
a dicarboxylic acid component (A) comprising:
  (a) 10 to 50 mol % of isophthalic acid or an ester forming derivative thereof,
  (b) 20 to 60 mol % of a phenylenedi(oxyacetic acid) represented by the formula [I]:

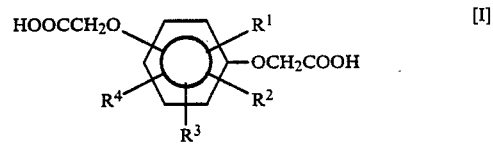

(wherein $R^1$, $R^2$, $R^3$ and $R^4$ each represent a hydrogen atom, an alkyl group having 1 to 6 carbon atoms, an alkoxy group having 1 to 6 carbon atoms, a phenyl group, a chlorine atom, a bromine atom or a fluorine atom), or an ester forming derivative thereof, and (c) 10 to 45 mol % of naphthalenedicarboxylic acid or an ester forming derivative thereof, wherein the molar ratio of the component (b) and the component (c) is in the range of 50:50 to 80:20; and a diol component (B).

A copolymerized polyester of the present invention preferably has an intrinsic viscosity of 0.4 to 2.0, preferably 0.50 to 1.2 [measured at 30° C. by using a mixed solvent of phenol and tetrachloroethane (in a weight ratio of 1:1)=]. If the intrinsic viscosity is less than 0.4, the strength of the polyester obtained is so low that it is impossible to obtain practically necessary physical properties when the polyester is taken out of the reaction vessel after polymerization and cut into chips, or molded into a container such as a bottle, barrel and can by blending with polyethylene terephthalate or laminating on polyethylene terephthaate. On the other hand, if the intrinsic viscosity exceeds 2.0, the melting viscosity becomes so high as to make molding such as injection, extrusion or blowing difficult.

The glass transition point (Tg) of a copolymerized polyester of the present invention is preferably not lower than 35° C., more preferably 50° to 120° C. and the oxygen permeability thereof is preferably not more than 0.7 cc mm/m$^2$. day atm, more preferably not more than 0.4cc·mm/m$^2$·day·atm.

A copolymerized polyester of the present invention can be produced by any polymerization method which is conventionally known as a polymerization method for polyethylene terephthalate. For example, a polycondensation method may be adopted, which the method comprises the steps of directly esterifying isophthalic acid, naphthalenedicarboxylic acid, a phenylenedi(oxyacetic acid)represented by the formula [I] such as 1,3-phenylenedi(oxyacetic acid) and ethylene glycol under a pressure and thereafter gradually reducing the pressure while raising the temperature to polycondense the reaction product. It is also possible to produce a copolymerized polyester of the present invention by subjecting an ester derivative of isophthalic acid such as a dimethyl isophthalate, an ester derivative of naphthalenedicarboxylic acid such as dimethyl naphthalenedicarboxylate, an ester derivative of a phenylenedi(oxyacetic acid)represented by the general formula [I] such as diethyl 1,3-phenylenedi(oxyacetate) and ethylene glycol to an ester exchange reaction, and further polycondensing the reaction product.

In the production of such a polymer, it is preferable to use an esterifying catalyst, ester exchanging catalyst, polycondensing catalyst, stabilizer, etc.

As the ester exchanging catalyst, at least one known compound selected from calcium, manganese, zinc, sodium and lithium compounds is usable. Form the point of view of transparency, a manganese compound is more preferable. As the polycondensing catalyst, at least one known compound selected from antimony, germanium, titanium and cobalt compounds is usable. Antimony, germanium and titanium compounds are preferably used.

A conventionally known additive such as an antioxidant, ultraviolet absorber, fluorescent brightener, mold release agent, antistatic agent, dispersant and coloring agent such as a dye and a pigment may be added, if necessary, to a polyester in the present invention at any manufacturing stage. Alternatively, such an additive may be added before molding by what is called master batching.

A copolymerized polyester of the present invention may be subjected to heat treatment, if necessary, before use so as to reduce acetaldehyde or lower the oligomerization degree. Alternatively, a copolymerized polyester of the present invention may also be subjected to solid-state polymerization before use so as to enhance the polymerization degree, reduce acetaldehyde or lower the oligomerization degree.

The heat treatment is ordinarily preferably carried out at 30° C. to a temperature directly below the melting point, for several to several hundred hours. The solid-state polymerization is ordinarily preferably carried out at 120° C. to a temperature directly below the melting point, preferably 140° to 230° C. for less than several ten hours preferably 5 to 30 hours after the surfaces of the chips are crystallized at a temperature of 80° to 180° C.

The thus obtained copolymerized polyester of the present invention is melted and molded to obtain a product (article).

In order to produce a hollow molded product of the copolymerized polyester of the present invention, for example, a blow molding method such as a hot parison process or a cold parison process is adopted in which a preform is first produced by ordinary extrusion blow molding, injection blow molding, injection molding or extrusion molding, and the thus obtained preform is reheated and biaxially stretched as it is or after processing the mouth portion and the bottom portion.

It is also possible to form a uniaxially or biaxially stretched film from a copolymerized polyester of the present invention or a can-shaped container, a tray or the like by vacuum forming or air-pressure forming after it is formed into a sheet by injection molding. It is also possible to form a copolymerized polyester of the present invention into a multi-layered sheet of the polyester and polyethylene terephthalate, for example, by a multi-layer extruder and thereafter form the sheet into a uniaxially or biaxially stretched film, a can-shaped container or a tray.

It is further possible to blend a copolymerized polyester of the present invention with another thermoplastic resin composition such as polyethylene terephthalate, polybutylene terephthalate, polyethylene naphthalate, polyester elastomer, polycarbonate and polyamide so as to form an integral structure product. It is also possible to form a multi-layer structure product by using a copolymerized polyester of the present invention, a polyethylene terephthalate component or the above-described thermoplastic resin component.

As a blend, a composition of 5 to 80 wt % of a copolymerized polyester of the present invention and 20 to 95 wt % of another thermoplastic resin composition such as polyethylene terephthalate is preferable.

If the content of a polymerized polyester is less than 5 wt %, the improvement of the gas barrier property of polyethylene terephthalate is sometimes insufficient. If the content exceeds 80 wt %, the improving effect is sometimes lowered in the respects of mechanical strength and heat resistance.

A polyester composition according to the present invention also is melted and molded into a molded product (article). For example, a copolymerized polyester may be blended with polyethylene terephthalate, melted and kneaded by an extruder so as to obtain mixed chips and the mixed chips are molded. Alternatively, each of the components is dry blended and directly supplied to a molding process.

If the melting point and glass transition point of the copolymerized polyester of the present invention lower, the troubles such as fusing etc. are easily caused depending on the composition of the comonomers thereof and as a result the operating property tends to deteriorate. Accordingly, in the case where the copolymerized polyester of the present invention is used in the form of a blend with a base resin such as polybutylene terephthalate, polyethylene naphthalate, polyester elastomer, polycarbonate, polyamide etc., after previously mixing the copolymerized polyester of the present invention with the base resin and subjecting a mixture to heat treatment and/or solid-state polymerization so as to reduce acetaldehyde and lower the content of oligomer, the thus obtained blend is preferably used. These heat treatment and solid-state polymerization is ordinarily carried out at 30° C. to a temperature directly below the melting point of the base resin, preferably 100° to 300° C.

A polyester composition of the present invention can be formed into a film, sheet, container, and other packaging material by a melt molding method which is generally used in molding polyethylene terephthalate. The polyester composition is usable as a material having a high gas barrier property in an unstretched state. By stretching the polyester composition at least uniaxially, it is possible to improve the gas barrier property and the mechanical strength.

A stretched sheet of a polyester composition of the present invention is produced by stretching a polyester composition of the present invention which has been formed into a sheet by injection molding or extrusion molding. The stretching method adopted may be freely selected from uniaxially stretching, sequential biaxially stretching and simultaneous biaxially stretching. It is also possible to form a stretched sheet of a polyester composition of the present invention into a cup or a tray by air-pressure forming.

When a stretched sheet of a polyester composition of the present invention is produced, the stretching temperature is set between the glass transition point (Tg) of the polyester and a temperature 70° C. higher than the glass transition point (Tg) as in the case of producing a stretched sheet of a copolymerized polyester of the present invention. The stretching ratio is ordinarily 1.1 to 10 times, preferably 1.1 to 8 times in the case of uniaxial stretching, and 1.1 to 8 times, preferably 1.1 to 5 times in both machine and transverse directions in the case of biaxial stretching. The thus obtained stretched sheet of a polyester composition of the present invention is excellent in transparency, gas barrier property and mechanical strength and is useful as a packaging material in the form of a film, a cup or a tray.

A polyester hollow molded product of the present invention is produced by stretching and blowing the preform produced from a copolymerized polyester or a polyester composition of the present invention. It is, therefore, possible to use an apparatus conventionally used in the blow molding of polyethylene terephthalate. More specifically, a blow molding method such as a hot parison process or a cold parison process is adopted in which a preform is first produced by ordinary extrusion blow molding, injection blow molding, injection molding or extrusion molding, and the thus obtained preform is reheated and biaxially stretched as it is or after processing the mouth portion and the bottom portion. The stretching temperature is 70° to 120° C., preferably 80° to 110° C., and the stretching ratio is 1.5 to 3.5 times in the machine direction and 2 to 5 times in the circumferential direction.

When a polyester hollow molded product is produced, it is possible to first form a preform of a laminate comprising a layer of a copolymerized polyester or polyester composition of the present invention and a layer of polyalkylene terephthalate mainly containing polyethylene terephthalate, and to biaxially blow the thus obtained preform in order to produce a multi-layered hollow container. In this case, the structure of the multilayer is not restricted, but a multilayer of three to five layers is preferable.

Especially, a multi-layered structure of at least one copolymerized polyester or polyester composition of the present invention and at least one polyester layer containing polyethylene terephthalate as the main component (hereinafter referred to merely as "polyester layer") is preferable.

The polyester of the polyester layer in the present invention means polyethylene terephthalate and a non-thermal liquid crystal polyester containing polyethylene terephthalate as the main component. It is preferable that at least 80 mol % of the structural unit of the polyester is ethylene terephthalate units, and it is possible to use a dicarboxylic acid such as phthalic acid, isophthalic acid, hexahydrophthalic acid, naphthalenedicarboxylic acid, succinic acid, adipic acid and sebacic acid and a polyfunctional carboxylic acid such as trimellitic acid and pyromellitic acid as an acid component in the range of at most 20 mol % of the total acid component.

It is possible to use a glycol such as 1,2-propanediol, 1,3-propanediol, 1,4-butanediol, 1,6-hexanediol, neopentyl glycol, diethylene glycol, triethylene glycol and cyclohexanedimethanol, and a polyvalent alcohol such as trimethylolpropane, triethylolpropane and pentaerythritol in the range of not exceeding 20 mol % of the total alcohol component.

The intrinsic viscosity of the polyester containing polyethylene terephthalate as the main component is preferably 0.6 to 1.2 [measured at 30° C. by using a mixed solvent of phenol and tetrachloroethane (in a weight ratio of 1:1)], and the glass transition point (Tg) thereof is preferably 70° to 72° C.

The polyester may be blended with another polyester and used as a polyester layer. In this case, the content of polyethylene terephthalate in the polyester layer is preferably not less than 50%.

The polyester containing polyethylene terephthalate as the main component can be produced by a known polymerization method as in the copolymerized polyester of the present invention. The polyester may be subjected to solid-state polymerization, if necessary. The solid-state polymerization is ordinarily carried out at 170° C. to a temperature directly below the melting point of the polyester, preferably 183° to 230° C. for less than several ten hours, preferably not less than 5 hours.

A multi-layered polyester hollow container according to the present invention is produced by forming a preform of a multi-layered hollow container from a copolymerized polyester or polyester composition and a polyester containing polyethylene terephthalate as the main component which are obtained in the above-described method, and stretching the thus obtained preform at a temperature above the glass transition point (Tg) of the polyester layer at least in the biaxial direction. The multilayer may be composed of either two layers or not less than three layers. A multilayer of three to five layers is preferable. In this case, it is preferable that the innermost layer of the hollow container is a polyester layer. This is because the copolymerized polyester and polyester composition have slightly more low-molecular weight components than polyethylene terephthalate, so that it is unfavorable that the copolymerized polyester and polyester composition are in direct contact with the content. The outermost layer of the hollow container may be either the copolymerized polyester, polyester composition or polyethylene terephthalate, but polyethylene terephthalate is preferable in terms of surface strength. When the outermost layer is composed of the copolymerized polyester or polyester composition, a protective layer may be provided on the outside of the outermost layer for the purpose of protecting the surface. The protective layer may be formed at a stage for forming the preform of the hollow container. Alternatively, the protective layer may be formed after the preform is stretched so as to produce the hollow container by labelling or the like.

The thickness of the polyester layer and the thickness of the copolymerized polyester layer are not specified. Generally, the total thickness of the bottle body is 200 to 700 μ, preferably 250 to 600 μ. The thickness of the copolymerized polyester or polyester composition layer is different depending upon the desired barrier property, but it is generally 5 to 300 μ, preferably 10 to 200 μ.

A container of the present invention is produced by extrusion blow molding or biaxial orientation blow molding which is conventionally known. Biaxial orientation blow molding is more advantageous. In the case of using biaxial orientation blow molding, the preform of the hollow container is formed, and after the preform is heated to the stretching temperature, it is stretched within a blow mold.

In order to form a preform of the hollow container having a multi-layer structure, a bottomed preform may be formed by injection molding, or after a multi-layered pipe is formed, one end thereof may be formed into a bottom. When a preform of a hollow container having a multi-layer structure or a multi-layered pipe is produced, the layers may be formed sequentially from the innermost layer by an ordinary injection molding machine or a molding machine having a plurality of melt injection apparatuses, or the respective layers may be extruded from a plurality of injecting apparatuses into a single mold one by one, so that the polyethylene terephthalate resin injected first may constitute the innermost layer and the outermost layer and the copolymerized polyester or polyester composition injected later constitutes an intermediate layer. By selecting the injection timing, it is possible to design the preform so as to have three layers, five layers or more.

The preform of the hollow container obtained is generally heated in a heating zone having a heater such as a block heater and an infrared heater for the subsequent stretching process. The heating temperature for the preform for a polyester multi-layered hollow container of the present invention is determined by the glass transition temperature (hereinunder referred to as "Tg(1)") of the polyester layer and the glass transition temperature (hereinunder referred to as "Tg(2)") of the copolymerized polyester or polyester composition layer. The heating temperature is at least not lower than Tg(1), and preferably in the range of Tg(1) +5° C. to Tg (2) +80° C. If the heating temperature is too low, micro voids are produced due to cold stretching and the container unfavorably presents the pearl or foggy appearance. On the other hand, if the heating temperature is too high, the perform becomes too soft to obtain a hollow container having a sufficient stretching effect.

When the preform of a polyester multi-layered hollow container is stretched to form the hollow container, the preform is preferably stretched by 1 to 4 times in the machine direction and by 2 to 6 times in the transverse direction (circumferential direction of the container) by moving a rod in the machine direction and blowing pressurized air. In order to enhance the heat resistance of the container, it is possible to heat set the container by further heating the stretched hollow container within the mold at a temperature the same as or higher than the stretching temperature for a short time. In manufacturing a polyester multi-layered hollow container of the present invention, it is possible to blend other polyesters such as polyethylene terephthalate with the copolymerized polyester or polyester composition layer. In this case, the content of the copolymerized polyester in the layer is not less than 10 wt %, preferably not less than 30 wt %.

In such a polyester packaging material, a copolymerized polyester component of the present invention preferably exists in the range of 2 to 30 mol % of the total polyesters in terms of the phenylenedi(oxyacetic acid)unit represented by the general formula [I]. If the copolymerized polyester component exceeds 30 mol %, the gas barrier improving effect is sometimes not so prominent and the molded product cannot sometimes retain the practical physical properties. If the copolymerized polyester component is less than 2 mol %, the gas barrier improving effect is sometimes not prominent, either.

The copolymerized polyester or polyester composition of the present invention itself exhibits a high transparency and has an excellent gas barrier property. The copolymerized polyester on polyester composition of the present invention is useful as a packaging material and can also be widely used as a container, sheet, film, etc. in the form of a blend or a laminate with other thermoplastic resins.

Particularly, a blend or a laminate of the copolymerized polyester of the present invention with polyethylene terephthalate has a low gas permeability while retaining a high transparency, so that it can be utilized very advantageously. Such a blend or a laminate can also be used together with a gas barrier material such as vinylidene chloride or a saponified ethylene-vinyl acetate copolymer.

A polyester hollow molded product of the present invention, which has a high mechanical strength as well as excellent transparency and gas barrier property, can be widely used for fresh beverage, flavoring material, oil, alcoholic drink such as beer, wine and sake, and cosmetics. Particularly, the polyester hollow molded product of the present invention can be used as a small-sized container for carbonated drink, beer, wine or the like, which would not be preserved for a predetermined guaranteed period due to the insufficient gas barrier property by an ordinary biaxially stretched polyethylene terephthalate bottle.

Especially, a polyester multi-layered hollow container of the present invention has an excellent gas barrier property, a high mechanical strength free from ply separation and an excellent transparency in the external appearance. A polyester multi-layered hollow container of the present invention can therefore be widely used for fresh beverage, flavoring material, oil, alcoholic drink such as beer, wine and sake, and cosmetics.

The present invention will be explained in more detail with reference to the following non-limitative examples.

[EXAMPLES]

"Part" in the examples means "part by weight". The physical properties were measured in the following manners.

Intrinsic viscosity (deciliter/gram)

Intrinsic viscosity was measured at 30° C. in a mixed solvent of phenol-tetrachloroethane (weight ratio: 50:50).

Oxygen permeability

An extruded sheet sample of about 200 μm thick and a stretched bottle of about 200 μm thick were produced. The oxygen permeability was measured at 23° C. and 100% RH by an oxygen permeability measuring apparatus OX-TRAN 10/50 (produced by Modern Controls, USA) and expressed by cc·mm/m$^2$·day·atm or cc/bottle·day·atm.

EXAMPLE 1

16,000 parts of isophthalic acid and 7,100 parts of ethylene glycol were charged into an autoclave and were subjected to esterification reaction at 220° to 245° C. for 3 hours under a pressure of 2.5 kg/cm$^2$ in a nitrogen atmosphere under stirring, while distilling off the water produced during the reaction to the outside of the system.

To the esterified product, 2,400 parts of 1,3-phenylenedi(oxyacetic acid) and 16 parts of titanium tetrabutoxide were added. The pressure of the polymerizer was gradually reduced from ordinary pressure to 1 Torr and the temperature was gradually raised to 260° C., and after 5-hour polymerization in total, a transparent polyester having an intrinsic viscosity of 0.70 was obtained.

EXAMPLE 2

15,500 parts of dimethylisophthalate, 10,500 parts of ethylene glycol and 4 parts of manganese acetate tetrahydrate were charged into a reaction vessel and were subjected to ester exchange reaction while gradually raising the temperature from 160° C. to 230° C. until there was no effluent.

To the reaction system, 4,500 parts of 1,3-phenylenedi(oxyacetic acid), 2.6 parts of orthophosphoric acid and 2.0 parts of germanium dioxide were added. The pressure of the polymerizer was gradually reduced from ordinary pressure to 1 Torr and the temperature was gradually raised from 230° C. to 260° C., and after 4.5-hour polymerization in total, a highly transparent polyester having an intrinsic viscosity of 0.67 was obtained.

EXAMPLE 3

Polymerization was carried out in the same way as in Example 1 except that 12,000 parts of isophthalic acid and 7,000 parts of 1,3-phenylenedi(oxyacetic acid) were used. The intrinsic viscosity of the polymer obtained was 0.72.

EXAMPLE 4

Polymerization was carried out in the same way as in Example 1 except that 10,000 parts of isophthalic acid and 9,200 parts of 1,3-phenylenedi(oxyacetic acid) were used. The intrinsic viscosity of the polymer obtained was 0.68.

EXAMPLE 5

Polymerization was carried out in the same way as in Example 1 except that 6,000 parts of isophthalic acid and 12,000 parts of 1,3-phenylenedi(oxyacetic acid) were used. The intrinsic viscosity of the polymer obtained was 0.72.

EXAMPLE 6

Polymerization was carried out in the same way as in Example 1 except that 14,000 parts of isophthalic acid and 4,800 parts of 1,2-phenylenedi(oxyacetic acid) in place of 1,3-phenylenedi(oxyacetic acid) were used. The intrinsic viscosity of the polymer obtained was 0.70.

EXAMPLE 7

Polymerization was carried out in the same way as in Example 1 except that 14,000 parts of isophthalic acid and 4,800 parts of 1,4-phenylenedi(oxyacetic acid) in place of 1,3-phenylenedi(oxyacetic acid) were used. The intrinsic viscosity of the polymer obtained was 0.72.

COMPARATIVE EXAMPLE 1

18,000 parts of isophthalic acid and 8,000 parts of ethylene glycol were charged into an autoclave and were subjected to esterification reaction at 220° to 245° C. for 3 hours under a pressure of 2.5 kg/cm$^2$ in a nitrogen atmosphere under stirring, while distilling off the water produced during the reaction to the outside of the system.

To the esterified product, 18 parts of titanium tetrabutoxide were added. The pressure of the polymerizer was gradually reduced from ordinary pressure to 1 Torr and the temperature was gradually raised to 270° C., and after 4-hour polymerization in total, a highly transparent polyester having an intrinsic viscosity of 0.70 was obtained.

COMPARATIVE EXAMPLE 2

Polymerization was carried out in the same way as in Example 2 except that 15,500 parts of dimethylterephthalate were used in place of dimethylisophthalate. The intrinsic viscosity of the polymer obtained was 0.69.

COMPARATIVE EXAMPLE 3

18,000 parts of 1,3-phenylenedi(oxyacetic acid) and 5,500 parts of ethylene glycol were charged into an autoclave and were subjected to esterification reaction at 220° to 245° C. for 3 hours under a pressure of 2.5 kg/cm$^2$ in a nitrogen atmosphere under stirring, while distilling off the water produced during the reaction to the outside of the system.

To the esterified product, 18 parts of titanium tetrabutoxide were added. The pressure of the polymerizer was gradually reduced from ordinary pressure to 1 Torr and the temperature was gradually raised to 260° C., and after 3-hour polymerization in total, a highly transparent polyester having an intrinsic viscosity of 0.65 was obtained.

The polymer obtained was dried at 30° to 35° C. by a vacuum drier but the pellets were fused and difficult to use.

The polyester resins obtained in Examples 1 to 5 and Comparative Examples 1 and 2 were extruded into sheets of about 200 μm thick and the oxygen permeabilities thereof were measured. The results are shown in Table 1.

TABLE 1

| | Acid component | | A/B (Molar ratio) | Oxygen permeability (cc · mm/m² · day · atm) |
|---|---|---|---|---|
| | Component (A) | Component (B) | | |
| Example 1 | Isophthalic acid | 1,3-Phenylenedi(oxyacetic acid) | 90/10 | 0.61 |
| Example 2 | Dimethylisophthalate | 1,3-Phenylenedi(oxyacetic acid) | 80/20 | 0.35 |
| Example 3 | Isophthalic acid | 1,3-Phenylenedi(oxyacetic acid) | 70/30 | 0.22 |
| Example 4 | Isophthalic acid | 1,3-Phenylenedi(oxyacetic acid) | 60/40 | 0.16 |
| Example 5 | Isophthalic acid | 1,3-Phenylenedi(oxyacetic acid) | 40/60 | 0.12 |
| Example 6 | Isophthalic acid | 1,2-Phenylenedi(oxyacetic acid) | 80/20 | 0.37 |
| Example 7 | Isophthalic acid | 1,4-Phenylenedi(oxyacetic acid) | " | 0.58 |
| Comparative Example 1 | Isophthalic acid | — | 100/0 | 0.72 |
| Comparative Example 2 | Dimethylterephthalate | 1,3-Phenylenedi(oxyacetic acid) | 80/20 | " | 0.98 |

It is clear from Table 1 that a polymer containing a predetermined amount of phenylenedicarboxilic acid represented by the general formula (I) has a smaller gas permeability than polyethylene terephthalate and a copolymer of polyethylene terephthalate and phenylenedi(oxyacetic acid) and that such a polymer is suitable as a packaging material having a high gas barrier property.

EXAMPLE 8

38 parts of dimethylisophthalate, 48 parts of dimethylnaphthalene dicarboxylate, 48 parts of ethylene glycol and 0.03 part of manganese acetate tetrahydrate were charged into a reaction vessel and were subjected to easter exchange reaction while gradually raising the temperature from 160° C. to 230° C. until there was no effluent.

To the reaction system, 59 parts of 1,3-phenylenedi(oxyacetic acid), 0.02 part of orthophosphoric acid and 0.03 part of germanium dioxide were added in that order. The pressure of the polymerizer was gradually reduced from ordinary pressure to 0.5 Torr and the temperature was gradually raised from 230° C. to 260° C., and after 6-hour polymerization in total, a highly transparent polyester having an intrinsic viscosity of 0.71 was obtained.

EXAMPLE 9

Polymerization was carried out in the same way as in Example 8 except that 52 parts of dimethylisophthalate, 30 parts of 1,3-phenylenedi(oxyacetic acid), 65 parts of dimethylnaphthalene dicarboxylate and 66 parts of ethylene glycol were used. The intrinsic viscosity of the polymer obtained was 0.69.

EXAMPLE 10

51 parts of dimethylisophthalate, 89 parts of 1,3-phenylenedi(oxyacetic acid), 33 parts of ethylene glycol and 0.03 part of titanium tetrabutoxide were charged into a reaction vessel and were subjected to ester exchange reaction while gradually raising the temperature from 200° C. to 230° C. until there was no effluent.

The pressure of the polymerizer was gradually reduced from ordinary pressure to 1 Torr and the temperature was gradually raised from 230° C. to 260° C., and after 5.0-hour polymerization in total, a highly transparent polyester having an intrinsic viscosity of 0.65 was obtained.

EXAMPLE 11

Polymerization was carried out in the same way as in Example 8 except that 82 parts of dimethylisophthalate, 32 parts of 1,3-phenylenedi(oxyacetic acid), 34 parts of dimethylnaphthalene dicarboxylate and 70 parts of ethylene glycol were used. The intrinsic viscosity of the polymer obtained was 0.70.

EXAMPLE 12

Polymerization was carried out in the same way as in Example 8 except that 114 parts of dimethylisophthalate, 33 parts of 1,3-phenylenedi(oxyacetic acid), 0 part of dimethylnaphthalene dicarboxylate and 73 parts of ethylene glycol were used. The intrinsic viscosity of the polymer obtained was 0.68.

EXAMPLE 13

Polymerization was carried out in the same way as in Example 8 except that 25 parts of dimethylisophthalate, 52 parts of 1,3.phenylenedi(oxyacetic acid), 72 parts of 2,6-dimethylnaphthalene dicarboxylate and 48 parts of ethylene glycol were used. The intrinsic viscosity of the polymer obtained was 0.70.

EXAMPLE 14

Polymerization was carried out in the same way as in Example 8 except that 13 parts of dimethylisophthalate, 75 parts of 1,3-phenylenedi(oxyacetic acid), 65 parts of 2,6-dimethylnaphthalene dicarboxylate and 66 parts of ethylene glycol were used. The intrinsic viscosity of the polymer obtained was 0.68.

EXAMPLE 15

Polymerization was carried out in the same way as in Example 8 except that 29 parts of dimethylisophthalate, 83 parts of 1,3-phenylenedi(oxyacetic acid), 54 parts of 2,6-dimethylnaphthalene dicarboxylate and 73 parts of ethylene glycol were used. The intrinsic viscosity of the polymer obtained was 0.70.

COMPARATIVE EXAMPLE 4

Polymerization was carried out in the same way as in Example 8 except that 152 parts of dimethylisophthalate and 97 parts of ethylene glycol were used. The intrinsic viscosity of the polymer obtained was 0.73.

The copolymerized polyesters obtained in Examples 8 to 12 and Comparative Example 4 were pressed into sheets of about 200 μm thick and the oxygen permeabilities thereof were measured. The results are collectively shown in Table 2.

TABLE 2

| Examples of Copolymerized Polyester | | | | | | |
|---|---|---|---|---|---|---|
| | Dicarboxylic acid (Mol % in acid component) | | | | Tg | Intrinsic |
| | IPA[1] | PDDA[2] | NDCA[3] | PO$_2$[4] | (°C.) | viscosity |
| Example 8 | 30 | 40 | 30 | 0.25 | 53 | 0.71 |
| Example 9 | 40 | 20 | 40 | 0.48 | 66 | 0.69 |
| Example 10 | 40 | 60 | 0 | 0.11 | 39 | 0.65 |
| Example 11 | 60 | 20 | 20 | 0.43 | 56 | 0.70 |
| Example 12 | 80 | 20 | 0 | 0.30 | 48 | 0.68 |
| Example 13 | 20 | 35 | 45 | 0.30 | 60 | 0.70 |
| Example 14 | 10 | 50 | 40 | 0.14 | 53 | 0.68 |
| Example 15 | 20 | 50 | 30 | 0.12 | 51 | 0.70 |
| Comparative Example 4 | 100 | 0 | 0 | 0.78 | 60 | 0.73 |

[Notes]
[1]IPA: isophthalic acid
[2]PDDA: 1,3-phenylenedi(oxyacetic acid)
[3]NDCA: 2,6-naphthalenedicarboxylic acid
[4]PO$_2$: oxygen permeability, cc · mm/m$^2$ · day · atm.

EXAMPLES 16 and 17

The copolymerized polyesters obtained in Examples 8 and 9 were melted and blended with a polyethylene terephthalate (RT 5436, produced by Nihon Unipet K.K.) having an intrinsic viscosity of 0.75 in the ratios shown in Table 3 and the blends were pressed into sheets of about 200 μm thick. The oxygen permeabilities thereof were measured. The results are shown in Table 3.

EXAMPLES 18–20 AND 21

The copolymerized polyester obtained in Examples 8, 9, 13 and 14 were respectively blended with a polyethylene terephthalate (RT 543C, produced by Nihon Unipet K.K.) in the state of pellets in the ratios shown in Table 3 and the blends were formed into flat plates of 6 cm × 6 cm by injection molding (by Nikko 0.80 z Injection machine). The flat plates were simultaneously stretched by 3 times in the machine and transverse directions by a Long stretching machine to obtain stretched sheets of about 100 μm thick. The oxygen permeabilities thereof were measured. The results are collectively shown in Table 3.

COMPARATIVE EXAMPLES 5 AND 6

The oxygen permeability of a polyethylene terephthalate (RT 543C, produced by Nihon Unipet K.K.) was measured in the form of an unstretched film in the same way as in Examples 8 and 9. The oxygen permeability thereof was also measured in the form of a stretched film in the same way as in Examples 15 and 16. The results are shown in Table 3.

COMPARATIVE EXAMPLES 7 AND 8

The polyethylene isophthalate obtained in Comparative Example 4 was blended with a polyethylene terephthalate in the same way as in Examples 8 and 9, and the oxygen permeability of the unstretched film was measured. The polyethylene isophthalate was also blended with a polyethylene terephthalate and the blend was stretched in the same way as in Examples 18 and 19 to obtain a stretched film. The oxygen permeability thereof was measured. The results are shown in Table 3.

TABLE 3

| Oxygen Permeability of Polyester Composition[1] | | | | |
|---|---|---|---|---|
| | Copolymerized Polyester produced in | Stretching condition[2] | Mixing amount (wt %)[3] | PO$_2$[4] |
| Example 16 | Example 8 | Unstretched | 20 | 1.9 |
| Example 17 | Example 9 | Unstretched | 30 | 2.0 |
| Example 18 | Example 8 | 3 × 3 | 5 | 1.5 |
| | | | 20 | 0.85 |
| | | | 40 | 0.56 |
| Example 19 | Example 9 | 3 × 3 | 10 | 1.6 |
| | | | 30 | 1.1 |
| | | | 60 | 0.78 |
| Example 20 | Example 13 | 3 × 3 | 5 | 1.2 |
| | | | 20 | 0.74 |
| Example 21 | Example 14 | 3 × 3 | 10 | 0.60 |
| | | | 20 | 0.48 |
| Comparative Example 5 | — | Unstretched | 0 | 3.6 |
| Comparative Example 6 | — | 3 × 3 | 0 | 2.3 |
| Comparative Example 7 | Comparative Example 4 | Unstretched | 20 | 2.7 |
| Comparative Example 8 | Comparative Example 4 | 3 × 3 | 20 | 1.7 |

[Notes]
[1]Polyester composition: blend of polyethylene terephthalate (RT 543C, produced by Nihon Unipet K. K.) and copolymerized polyester
[2]Stretching conditions:
Stretching temperature: 98° C., simultaneous biaxial stretching
[3]Mixing amount: content of copolymerized polyester in the polyester composition
[4]PO$_2$: Oxygen permeability, cc · mm/m$^2$ · day · atm.

EXAMPLE 22

10 parts of the copolymerized polyester obtained in Example 8 were dry blended with 90 parts of a polyethylene terephthalate (RT 543C, produced by Nihon Unipet K.K.), and the blend was formed into a preform for a bottle by injection molding. The preform was formed into a stretched bottle having an inner volume of 1.5 l by a biaxial orientation blowing machine. The average wall thickness of the shoulder portion and the body portion was 0.33 mm and the total surface area was 700 cm$^2$. The oxygen permeability of the bottle obtained was measured 0.21 cc/bottle.day.atm.

EXAMPLE 23

20 parts of the copolymerized polyester obtained in Example 13 were dry blended with 80 parts of a polyethylene terephthalate (RT 543C, produced by Nihon Unipet K.K.), and the blend was formed into a preform for a bottle by injection molding. The preform was formed into a stretched bottle having an inner volume of 1.5 l by a biaxial orientation blowing machine. The average wall thickness of the shoulder portion and the body portion was 0.33 mm and the total surface area was 700 cm². The oxygen permeability of the bottle obtained was measured 0.21 cc/bottle.day.atm.

COMPARATIVE EXAMPLE 9

A stretched bottle having an inner volume of 1.5 l was formed by using a polyethylene terephthalate (RT 543C, produced by Nihon Unipet K.K.) solely in the same way as in Example 22. The oxygen permeability of the bottle obtained was measured 0.43 cc/bottle.day.atm.

COMPARATIVE EXAMPLE 10

A stretched bottle having an inner volume of 1.5 l was formed by using 10 parts of the polyethylene isophthalate obtained in Comparative Example 4 and 90 parts of a polyethylene terephthalate (RT 543C, produced by Nihon Unipet K.K.) in the same way as in Example 22. The oxygen permeability of the bottle obtained was measured 0.34 cc/bottle.day.atm.

COMPARATIVE EXAMPLE 11

A preform for a bottle was produced by injection molding by using 10 parts of the copolymerized polyester obtained in Example 8. The preform was formed into a stretched bottle having an inner volume of 1.5 l by a biaxial orientation blowing machine. The configuration of the bottle obtained was irregular and the mechanical strength thereof was low.

As is clear from the above Examples and Comparative Examples, a copolymerized polyester composition of the present invention, an oriented molded product thereof and a hollow container produced therefrom exhibit better gas barrier property than a polyethylene terephthalate itself or a blend of a polyethylene terephthalate and a polyethylene isophthalate, and a copolymerized polyester of the present invention is therefore suitable as a packaging material which is required to have a high gas barrier property.

EXAMPLE 24

97 parts of dimethylisophthalate, 18 parts of dimethyl-2,6-naphthalene dicarboxylate, 71 parts of ethylene glycol and 0.03 part of manganese acetate tetrahydrate were charged into a reaction vessel and were subjected to ester exchange reaction while gradually raising the temperature from 160° C. to 230° C. until there was no effluent.

To the reaction system, 32 parts of 1,3-phenylenedi(oxyacetic acid), 0.02 part of orthophosphoric acid and 0.03 part of germanium dioxide were added in that order. The pressure of the polymerizer was gradually reduced from ordinary pressure to 1 Torr and the temperature was gradually raised from 230° C. to 260° C., and after 4.5-hour polymerization in total, a highly transparent polyester having an intrinsic viscosity of 0.67 was obtained.

EXAMPLE 25

Polymerization was carried out in the same way as in Example 24 except that 82 parts of dimethylisophtalate, 34 parts of dimethyl-2,6-naphthalene dicarboxylate, 70 parts of ethylene glycol and 32 parts of 1,3-phenylenedi(oxyacetic acid) were used. The intrinsic viscosity of the polymer obtained was 0.64.

EXAMPLE 26

Polymerization was carried out in the same way as in Example 24 except that 66 parts of dimethylisophthalate, 50 parts of dimethyl-2,6-naphthalene dicarboxylate, 68 parts of ethylene glycol and 31 parts of 1,3-phenylenedioxyacetic acid) were used. The intrinsic viscosity of the polymer obtained was 0.60.

EXAMPLE 27

Polymerization was carried out in the same way as in Example 24 except that 81 parts of dimethylisophthalate, 17 parts of dimethyl-2,6-naphthalene dicarboxylate, 61 parts of ethylene glycol and 47 parts of 1,3-phenylenedi(oxyacetic acid) were used. The intrinsic viscosity of the polymer obtained was 0.61.

EXAMPLE 28

Polymerization was carried out in the same way as in Example 24 except that 66 parts of dimethylisophthalate, 33 parts of dimethyl-2,6-naphthalene dicarboxylate, 59 parts of ethylene glycol and 46 parts of 1,3-phenylenedi(oxyacetic acid) were used. The intrinsic viscosity of the polymer obtained was 0.60.

EXAMPLE 29

Polymerization was carried out in the same way as in Example 24 except that 45 parts of dimethylisophthalate, 23 parts of dimethyl-2,6-naphthalene dicarboxylate, 22 parts of dimethyl-4,4'-biphenyldicarboxylate, 50 parts of ethylene glycol and 32 parts of 1,3-phenylenedi(oxyacetic acid) were used. The intrinsic viscosity of the polymer obtained was 0.63.

The polyester resins obtained in Examples 24 to 29 and Comparative Example were extruded into sheets of about 200 μm thick and the oxygen permeabilities thereof were measured. The results are collectively shown in Table 4.

TABLE 4

| | Dicarboxylic acid (mol % in acid component) | | | | |
|---|---|---|---|---|---|
| | IPA[1] | PDDA[2] | NDCA[3] | PO$_2$[4] | Tg (°C.) |
| Example 24 | 70 | 20 | 10 | 0.38 | 52 |
| Example 25 | 60 | 20 | 20 | 0.42 | 57 |
| Example 26 | 50 | 20 | 30 | 0.46 | 60 |
| Example 27 | 60 | 30 | 10 | 0.28 | 50 |
| Example 28 | 50 | 30 | 20 | 0.32 | 53 |
| Example 29[5] | 42 | 26 | 17 | 0.48 | 58 |

[Notes]
[1]IPA: isophthalic acid
[2]PDDA: 1,3-phenylenedi(oxyacetic acid)
[3]NDCA: 2,6-naphthalene dicarboxylic acid
[4]PO$_2$: oxygen permeability, cc · mm/m² · day · atm.
[5]containing 15 mol % of 4,4'-biphenyldicarboxylic acid based on the total acid component As is clear from Table 4, a copolymerized polyester of the present invention has achieved a lower gas permeability than that of polyethylene isophthalate without extremely lowering the Tg (Tg ≧ 50° C.), and a copolymerized polyester of the present invention is therefore suitable as a gas barrier material.

EXAMPLE 30

20 parts of the copolymerized polyester obtained in Example 28 were dry blended with 80 parts of a polyethylene terephthalate (RT 543C, produced by Nihon Unipet K.K.), and the blend was formed into a preform for a bottle by injection molding. The preform was formed into a stretched bottle having an inner volume of 1.5 l by a biaxial orientation blowing machine. The average wall thickness of the shoulder portion and the body portion was 0.33 mm and the total surface area was 700 cm². The oxygen permeability of the bottle obtained was measured 0.22 cc/bottle.day.atm.

COMPARATIVE EXAMPLE 12

A stretched bottle having an inner volume of 1.5 l was formed by using a polyethylene terephthalate (RT 543C, produced by Nihon Unipet K.K.) solely in the same way as in Example 30. The oxygen permeability of the bottle obtained was measured 0.43 cc/bottle.day.atm.

EXAMPLE 31

52 parts of dimethylisophthalate, 60 parts of 1,3-phenylenedi(oxyacetic acid), 32 parts of dimethyl-2,6-naphthalene dicarboxylate, 49 parts of ethylene glycol and 0.03 part of titanium tetrabutoxide were charged into a reaction vessel and were subjected to ester exchange reaction while gradually raising the temperature from 200° C. to 230° until there was no effluent.

The pressure of the polymerizer was gradually reduced from ordinary pressure to 1 Torr and the temperature was gradually raised from 230° C. to 260° C., and after 5.0-hour polymerization in total, a highly transparent polyester having an intrinsic viscosity of 0.67 was obtained.

EXAMPLE 32

Polymerization as carried out in the same way as in Example 31 except that 38 parts of dimethylisophthalate, 59 parts of 1,3-phenylenedi(oxyacetic acid), 48 parts of dimethyl-2,6-naphthalene dicarboxylate and 48 parts of ethylene glycol were used. The intrinsic viscosity of the polymer obtained was 0.64.

EXAMPLE 33

Polymerization was carried out in the same way as in Example 31 except that 25 parts of dimethylisophthalate, 72 parts of 1,3-phenylenedi(oxyacetic acid), 46 parts of dimethyl-2,6-naphthalene dicarboxylate and 39 parts of ethylene glycol were used. The intrinsic viscosity of the polymer obtained was 0.61.

EXAMPLE 34

Polymerization was carried out in the same way as in Example 31 except that 24 parts of dimethylisophthalate, 85 parts of 1,3-phenylenedi(oxyacetic acid), 31 parts of dimethyl-2,6-naphthalene dicarboxylate and 31 parts of ethylene glycol were used. The intrinsic viscosity of the polymer obtained was 0.63.

EXAMPLE 35

Polymerization was carried out in the same way as in Example 31 except that 17 parts of dimethylisophthalate, 58 parts of 1,3-phenylenedi(oxyacetic acid), 21 parts of dimethyl-2,6-naphthalene dicarboxylate and 20 parts of ethylene glycol were used. The intrinsic viscosity of the polymer obtained was 0.64.

COMPARATIVE EXAMPLE 13

Polymerization was carried out in the same way as in Example 31 except that 52 parts of dimethylisophthalate, 99 parts of dimethyl-2,6-naphthalene dicarboxylate and 84 parts of ethylene glycol were used. The intrinsic viscosity of the polymer obtained was 0.68.

The polyester resins obtained in Examples 31 to 35 and Comparative Example 13 were extruded into sheets of about 200 μm thick and the oxygen permeabilities thereof were measured. The results are collectively shown in Table 5.

TABLE 5

| | Dicarboxylic acid (Mol % in acid component) | | | | Tg |
|---|---|---|---|---|---|
| | IPA*[1] | PDDA*[2] | NDCA*[3] | PO$_2$*[4] | (°C.) |
| Example 31 | 40 | 40 | 20 | 0.22 | 49 |
| Example 32 | 30 | 40 | 30 | 0.24 | 52 |
| Example 33 | 20 | 50 | 30 | 0.18 | 48 |
| Example 34 | 20 | 60 | 20 | 0.15 | 45 |
| Example 35*[5] | 17 | 51 | 17 | 0.24 | 50 |
| Comparative Example 13 | 40 | 0 | 60 | 0.85 | 86 |

[Notes]
*[1]IPA: isophthalic acid
*[2]PDDA: 1,3-phenylenedi(oxyacetic acid)
*[3]NDCA: 2,6-naphthalenedicarboxylic acid
*[4]PO$_2$: oxygen permeability, cc · mm/m² · day · atm.
*[5]Containing 15 mol % of 4,4'-biphenyldicarboxylic acid based on the total acid component As is clear from Table 5, a copolymerized polyester of the present invention has achieved a lower gas permeability than that of a polyethylene isophthalate without extremely lowering the Tg (Tg≧40° C.), and a copolymerized polyester of the present invention is therefore suitable as a gas barrier material.

EXAMPLE 36

10 parts of the copolymerized polyester obtained in Example 34 were dry blended with 90 parts of a polyethylene terephthalate (RT 543C, produced by Nihon Unipet K.K.), and the blend was formed into a preform for a bottle by injection molding. The preform was formed into a stretched bottle having an inner volume of 1.5 l by a biaxial orientation blowing machine. The average wall thickness of the shoulder portion and the body portion was 0.33 mm and the total surface area was 700 cm². The oxygen permeability of the bottle obtained was measured 0.20 cc/bottle.day.atm.

COMPARATIVE EXAMPLE 14

A stretched bottle having an inner volume of 1.5 l was formed by using a polyethylene terephthalate (RT 543C, produced by Nihon Unipet K.K.) solely in the same way as in Example 36. The oxygen permeability of the bottle obtained was measured 0.43 cc/bottle.day.atm.

COMPARATIVE EXAMPLE 15

A stretched bottle having an inner volume of 1.5 l was formed by using 10 parts of the polyethylene isophthalate obtained in Comparative Example 4 and 90 parts of a polyethylene terephthalate (RT 543C, produced by Nihon Unipet K.K.) in the same way as in Example 36. The oxygen permeability of the bottle obtained was measured 0.37 cc/bottle.day.atm.

EXAMPLE 37

A three-layered hollow container was produced by a multi-layered hollow container molding machine (Nissei ASB 50TH) in such a manner that the copolymerized polyester obtained in Example 8 for an intermediate layer constituted the intermediate layer and a polyethylene terephthalate (RT 543C, produced by Nihon Unipet K.K., glass transition point (Tg): 72° C.) constituted the outer and the inner layers. The cylinder temperature was set at 270° C. on the polyethylene terephthalate side, and at 245° C. at the copolymerized polyester side. A preform was formed at a mold temperature of 10° C. by injection molding and the preform obtained was formed into a hollow container having an inner volume of 500 cc by blow stretching at a surface temperature of 95° C. The total length of the hollow container obtained was 183 mm, the outer diameter of the body portion was 73 mm and the wall thickness of the body portion was 300 μm. No ply separation was observed.

The content of the copolymerized polyester in the container and the oxygen permeability of the container are shown in Table 6.

EXAMPLE 38

A multi-layered hollow container was produced by using the copolymerized polyester obtained in Example 9 and the polyethylene terephthalate in the same way as in Example 37. The oxygen permeability of the container obtained is shown in Table 6.

EXAMPLE 39

Three kinds of multi-layered hollow containers were produced by using the copolymerized polyester obtained in Example 12 and the polyethylene terephthalate in the same way as in Example 37 while varying the content of the copolymerized polyester in the container. The oxygen permeability of the containers obtained are shown in Table 6.

EXAMPLE 40

A multi-layered hollow container was produced by using the copolymerized polyester obtained in Example 13 and the polyethylene terephthalate in the same way as in Example 37. The oxygen permeability of the container obtained is shown in Table 6.

EXAMPLE 41

A multi-layered hollow container was produced by using the copolymerized polyester obtained in Example 14 and the polyethylene terephthalate in the same way as in Example 37. The oxygen permeability of the container obtained is shown in Table 6.

EXAMPLE 42

Two kinds of multilayered hollow containers were produced by using the copolymerized polyester obtained in Example 15 and the polyethylene terephthalate in the same way as in Example 37 while varying the content of the copolymerized polyester in the container. The oxygen permeability of the container obtained is shown in Table 6.

COMPARATIVE EXAMPLE 16

A single-layered bottle consisting of a polyethylene terephthalate (RT 543C, produced by Nihon Unipet K.K.) was produced in the same way as in Example 37. The oxygen permeability of the container obtained is shown in Table 6.

COMPARATIVE EXAMPLE 17

A multi-layered hollow container was produced in the same way as in Example 37 except for using the polyethylene isophthalate obtained in Comparative Example 4 in place of the copolymerized polyester. The oxygen permeability of the container obtained is shown in Table 6.

TABLE 6

Oxygen Permeability of Polyester Multi-Layered Hollow Container

| | Copolymerized polyester | wt % in container | $PO_2^1$ |
|---|---|---|---|
| | Raw Material | | |
| Example 37 | Example 8 | 20 | 0.10 |
| Example 38 | Example 9 | 20 | 0.15 |
| Example 39 | Example 12 | 10 | 0.15 |
| | | 20 | 0.11 |
| | | 40 | 0.07 |
| Example 40 | Example 13 | 20 | 0.08 |
| Example 41 | Example 14 | 20 | 0.05 |
| Example 42 | Example 15 | 5 | 0.12 |
| | | 20 | 0.04 |
| Comparative Example 16 | — | 0 | 0.25 |
| Comparative Example 17 | Comparative Example 4 | 20 | 0.18 |
| | | 40 | 0.15 |

[Note]
$^1PO_2$: oxygen permeability, cc/bottle · day · atm.
value obtained by correcting the amount of oxygen permeated in air by the percentage (21%) of oxygen.

As is clear from the above Examples and Comparative Examples, a polyester multi-layered hollow container of the present invention exhibits a better gas barrier property than a single-layered container of a polyethylene terephthalate or a multi-layered container of a polyethylene terephthalate and a polyethylene isophthalate. In addition, since use of a small amount of copolymerized polyester, as compared with a polyethylene terephthalate, produces a container having a good gas barrier property, the mechanical strength and the heat resistance which a polyethylene terephthalate container intrinsically has are not impaired. Thus, a polyester multi-layered hollow container of the present invention is suitable as a container which is required to have a high gas barrier property.

What is claimed is:

1. A polyester composition comprising:
   (i) a copolymerized polyester produced by copolymerizing a dicarboxylic acid component (A) comprising
      (a) 10 to 90 mol % of isophthalic acid or an ester forming derivative thereof,
      (b) 10 to 60 mol % of a phenylenedi(oxyacetic acid) represented by the formula [I]:

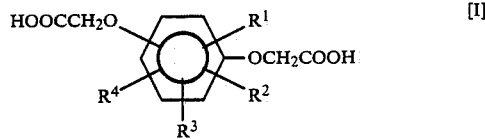

(wherein $R^1$, $R^2$, $R^3$ and $R^4$ each represent a hydrogen atom, an alkyl group having 1 to 6 carbon atoms, an alkoxy group having 1 to 6 carbon atoms, a phenyl group, a chlorine atom, a bromine atom or a fluorine atom), or an ester forming derivative thereof; and
      (c) 0 to 45 mol % of a naphthalenedicarboxylic acid or an ester forming derivative thereof, and a diol component (B); and
   (ii) a polyester containing polyethylene terephthalate as the main constituent.

2. A polyester composition according to claim 1, wherein the content of said copolymerized polyester is 5 to 80 wt % and the content of said polyester containing polyethylene terephthalate as the main constituent is 20 to 95%.

* * * * *